US012566626B2

(12) United States Patent
Abdollahian Noghabi et al.

(10) Patent No.: US 12,566,626 B2

(45) Date of Patent: Mar. 3, 2026

(54) EDGE CLOUD HIERARCHICAL LANGUAGE MODEL DESIGN

(71) Applicant: Microsoft Technology Licensing, LLC, Redmond, WA (US)

(72) Inventors: Shadi Abdollahian Noghabi, Bellevue, WA (US); Ranveer Chandra, Kirkland, WA (US); Leonardo de Oliveira Nunes, Rio de Janeiro (BR); Alexander Steven Crown, Bellevue, WA (US); Vinamra Benara, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/657,377

(22) Filed: May 7, 2024

(65) Prior Publication Data

US 2025/0348349 A1    Nov. 13, 2025

(51) Int. Cl.
| | |
|---|---|
| *G06F 9/48* | (2006.01) |
| *G06N 3/082* | (2023.01) |
| *H04L 67/10* | (2022.01) |

(52) U.S. Cl.
CPC ............... *G06F 9/48* (2013.01); *G06N 3/082* (2013.01); *H04L 67/10* (2013.01)

(58) Field of Classification Search
CPC ............ G06F 9/48; G06N 3/082; H04L 67/10
See application file for complete search history.

(56) References Cited

U.S. PATENT DOCUMENTS

| | | | | |
|---|---|---|---|---|
| 9,064,495 | B1 * | 6/2015 | Torok | G10L 15/01 |
| 9,430,465 | B2 * | 8/2016 | Waibel | G10L 13/02 |
| 9,514,747 | B1 * | 12/2016 | Bisani | G10L 25/60 |
| 10,621,282 | B1 * | 4/2020 | Selfridge | G10L 15/1815 |
| 11,238,849 | B1 * | 2/2022 | Mimassi | G10L 15/07 |
| 11,314,941 | B2 * | 4/2022 | Aly | G10L 15/1815 |
| 11,521,066 | B2 * | 12/2022 | Lee | G06N 3/006 |
| 12,155,535 | B2 * | 11/2024 | Pack | H04L 41/16 |
| 12,206,552 | B2 * | 1/2025 | Guim Bernat | G06F 9/5094 |
| 12,265,788 | B1 * | 4/2025 | Fieldman | G06F 21/6218 |
| 12,321,794 | B2 * | 6/2025 | Faonte | G06F 9/54 |
| 2018/0211668 | A1 * | 7/2018 | Willett | G10L 15/30 |

(Continued)

FOREIGN PATENT DOCUMENTS

WO       WO-2025093339 A1 *   5/2025   ............. G06N 20/00

OTHER PUBLICATIONS

Minrui Xu et al. "Unleashing the Power of Edge-Cloud Generative AI in Mobile Networks: A Survey of AIGC Services", Oct. 31, 2023, 43 pages. (Year: 2023).*

(Continued)

*Primary Examiner* — G. C. Neurauter, Jr.

(74) *Attorney, Agent, or Firm* — Microsoft Technology Licensing, LLC; Tiffany B. Healy

(57)       ABSTRACT

The present disclosure relates to systems and methods for using language models in locations with limited network connectivity. The systems and methods include a hierarchical edge architecture with a plurality of language models with diverse compute capabilities. The systems and methods dynamically select a language model from the plurality of language models to use to respond to a query received by a user in response to determining a level of network connectivity available at a user device.

20 Claims, 4 Drawing Sheets

(56) References Cited

U.S. PATENT DOCUMENTS

| | | | | |
|---|---|---|---|---|
| 2023/0164030 A1* | 5/2023 | Ning | | H04L 41/145 |
| 2023/0325670 A1* | 10/2023 | Clemons | | G06N 3/09 |
| | | | | 706/15 |
| 2024/0203127 A1* | 6/2024 | Kamani | | G06V 20/52 |
| 2024/0330699 A1* | 10/2024 | Yao | | G06N 3/04 |
| 2025/0086952 A1* | 3/2025 | Wu | | G06V 10/761 |
| 2025/0094878 A1* | 3/2025 | Rivlin | | G06N 3/08 |
| 2025/0140245 A1* | 5/2025 | Lee | | G06F 16/90332 |
| 2025/0147811 A1* | 5/2025 | Khosrowpour | | G06F 9/505 |
| 2025/0156487 A1* | 5/2025 | Nguyen | | H04M 3/5238 |

OTHER PUBLICATIONS

Lubomir Bulej et al. "Managing latency in edge-cloud environment", The Journal of Systems & Software 172 (2021) 110872, 15 pages. (Year: 2021).*
Jinke Ren et al. "Collaborative Cloud and Edge Computing for Latency Minimization", IEEE Transactions on Vehicular Technology, vol. 68, No. 5, May 2019, 14 pages. (Year: 2019).*
Extended European search report received for European Application No. 25172623.8, mailed on Oct. 20, 2025, 7 Pages.
Pravinkrishnan, et al., "An Overview of Chatbots using ML Algorithms in Agricultural Domain", International Journal of Computer Applications, vol. 184, No. 11, May 1, 2022, pp. 15-22.

* cited by examiner

200

Receiving, at a user device, a query — 202

Selecting, from a plurality of language models with diverse compute capabilities, a small language model on the user device in response to determining that the user device has limited network connectivity — 204

Using the small language model to provide the response to the query — 206

Providing the response to the user — 208

300

Receiving a trigger to generate user specific context — 302

Automatically generating the user specific context in response to the trigger — 304

Sending the user specific context to a user device for storage — 306

EDGE CLOUD HIERARCHICAL LANGUAGE MODEL DESIGN

BACKGROUND

Providing large language models (LLMs) in areas with limited and unreliable internet connections has challenges. Relying solely on cloud-based solutions for insights leads to prolonged downtime during network outages, significant delays due to data upload over weak links, and high operational costs associated with running LLMs.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving, at a user device, a query. The method includes selecting, from a plurality of language models with diverse compute capabilities, a small language model (SLM) on the user device in response to determining that the user device has limited network connectivity. The method includes using the SLM to provide the response to the query. The method includes providing the response to the user.

Some implementations relate to a device. The device includes a processor; memory in electronic communication with the processor; and instructions stored in the memory, the instructions being executable by the processor to: receive a query; select, from a plurality of language models with diverse compute capabilities, a small language model (SLM) on the user device in response to determining that the user device has limited network connectivity; use the SLM on the user device to provide the response to the query; and provide the response to the user.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
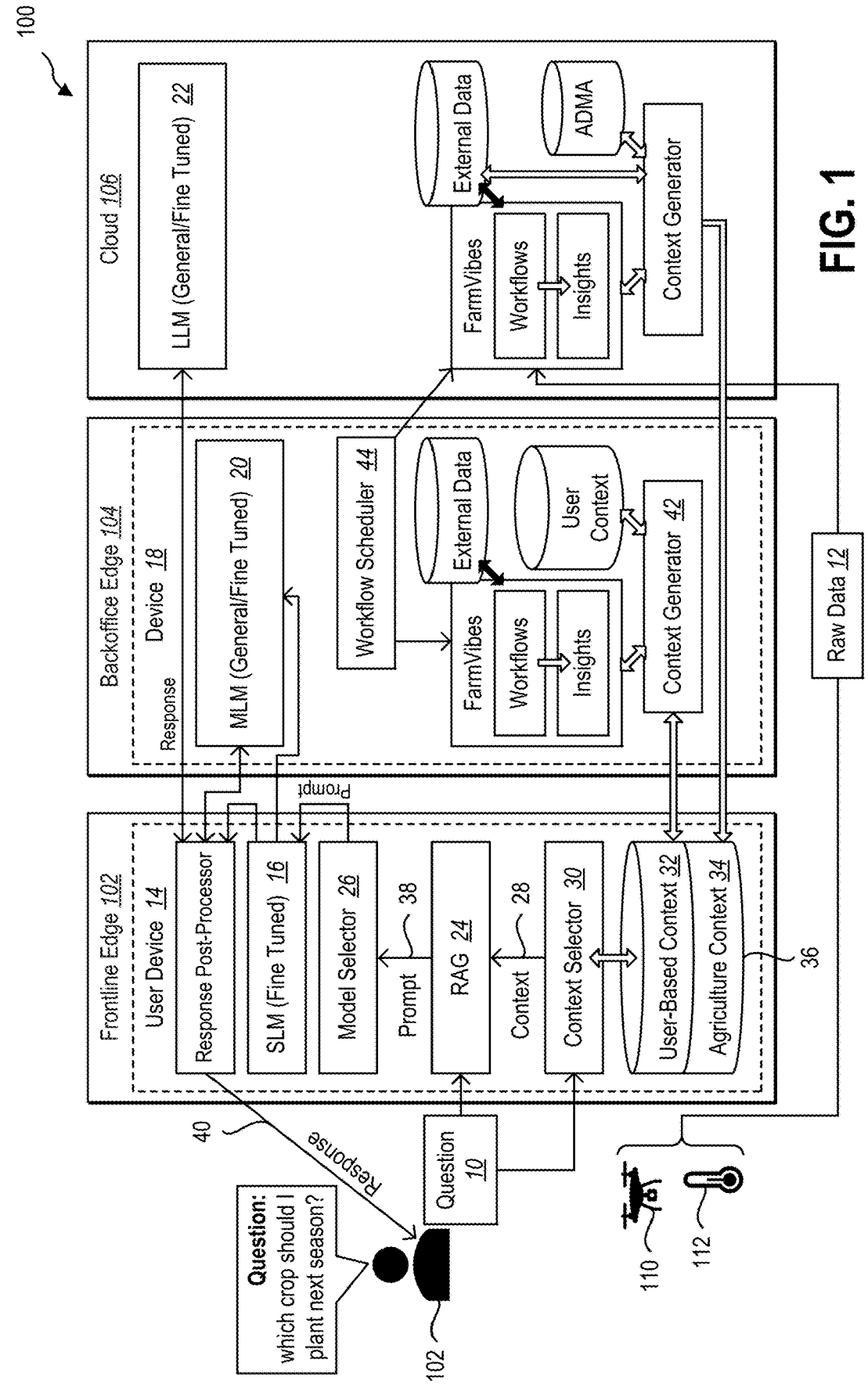
FIG. 1 illustrates an example environment for using language models in locations with limited network connectivity in accordance with implementations of the present disclosure.

This disclosure generally relates to using language models in areas with limited network connectivity. Using large language models (LLMs) in cloud-based solutions in locations with limited and unreliable internet connections has challenges. Cloud-based solutions typically have multiple users and combine inputs from the multiple users to share resources and maximize the throughput of the cloud-based solutions among the different users. Locations with limited network connectivity are unable to send large amounts of data to the cloud.

One example industry occurring in areas with limited and unreliable network connectivity is agriculture. Farms may be in remote areas with limited network connectivity. In addition, farms may have areas where network connectivity is spotty or unreliable. Farmers may have difficulty using LLM supported solutions (e.g., chatbots) with the weak or intermittent network connectivity on farms.

Another example industry occurring in areas with limited network connectivity is oil. Oil wells usually are in remote areas where network connectivity is weak or unreliable. Workers at the oil wells may have difficulty using LLM supported solutions due to the limited network connectivity on oil rigs. Another example industry occurring in areas with limited network connectivity is manufacturing in remote locations. Workers in manufacturing plants may have difficulty using LLM supported solutions due to weak or unreliable network connectivity in the manufacturing plants.

Relying solely on cloud-based LLM solutions in locations with limited or unreliable network connectivity for insights leads to prolonged downtime during network outages, significant delays due to data upload over weak links, and high operational costs associated with running artificial intelligence (AI) pipelines and LLMs.

The present disclosure provides systems and methods for using language models in areas with limited network connectivity. The systems and method use edge computing to process data locally on a device of a user, reducing dependency on cloud-based resources and minimizing downtime during network interruptions. The present disclosure includes a number of practical applications that provide benefits and/or solve problems associated with using language models with limited network connectivity. Examples of these applications and benefits are discussed in further detail below.

The systems and methods of the present disclosure leverage a hierarchical edge computing architecture. The hierarchical edge architecture includes different tiers of compute (a frontline edge, back office edge, cloud) with language models having diverse compute capabilities and diverse memory footprints in each of the tiers. For example, smaller language models are used in the frontline edge, medium language models are used in back office edge, and LLMs are used in the cloud. The size of the model is determined based on a number of parameters for the language model. For example, language models with fewer parameters (e.g., a few billion parameters or lower) are consider a small language model (SLM). Examples of SLM include Phi-1, Phi-1.5, and Phi-2. For example, a medium language model may include models with 70 billion parameters to hundreds of billions parameters and an LLM may include hundreds of billion parameters. An example large language model (LLM) is GPT-4.

The systems and methods include a model selector that dynamically selects a language model to use in a tier of the hierarchical edge architecture in response to a query received by a user. In some implementations, the model selector uses query features and a context in selecting a language model (a small language model at the frontline edge, a medium language model at the back office edge, or an LLM at the cloud) to use to provide response to the query. For example, the context includes available network connectivity at a user device that receives the query from the user. Another example of context includes device parameters of the user device that receives the query (e.g., a current load of the device). Another example of context includes user context with information specific to the user. Another example of context includes industry specific context (e.g., agriculture context if the query relates to farming or oil context if the query relates to drilling for oil). The selected language model provides a response to the query and the response is output to the user.

The systems and methods also include the automatic generation of context specific to the user. The user specific context is generated in an offline manner using devices in the back office edge and the cloud. For example, the user specific context includes user based context (e.g., expense sheets, equipment manuals of equipment owned by the user, sensory data, building information, field boundaries) and general industry context (e.g., information from external sources for the industry). The user specific context (the user context and the industry context) is sent to the user device on the frontline edge so that the small language model on the user device can use the user specific context in responding to queries from the user.

One technical advantage of the systems and methods of the present disclosure is enabling an efficient use of language models with intermittent network connectivity. Another technical advantage of the systems and methods of the present disclosure is fast responses. The systems and methods use the hierarchical structure (frontline edge, back office edge, cloud) with use of several tiers of compute to enable fast and cost-effective responses. Another technical advantage of the systems and methods of the present disclosure is privacy of data. The systems and methods allow the use of local language models if the information being used is private and cannot be sent to a cloud-based application (or an application running in a different country) due to security concerns. By using edge computing, data is processed locally on a user device, reducing the dependence on cloud-based resources and minimizing downtime during network interruptions. The systems and methods use fine-tuned specialized models ensuring accurate and relevant insights tailored to each user's specific requirements, optimizing the overall efficiency to the systems and methods. Another technical advantage of the systems and methods of the present disclosure is dynamic model selection for each tier. The systems and methods dynamically select a language model to use (e.g., a local language model, a language model in the back office, or a language model in the cloud) in response to query parameters and available network connectivity.

Another technical advantage of the systems and methods of the present disclosure is offline preprocessing of data for improving model results. The systems and methods integrate with various data sources and run compute pipelines in the background to update data sources stored on the edge. By using the offline processing of data, the systems and methods leverage the load between a user device at the frontline edge and the devices at the back office edge and the cloud. The systems and methods determine which data to bring to edge and when to update the data at each tier, so the data is available for use by language models at each tier of the edge architecture. The systems and methods of the present disclosure optimize the model selection and data processing for the user. At the edge, a single tenant user is providing the queries. The systems and methods may cache personalized data and documents for the user and may optimize the latency of the responses to the queries.

An example use of the systems and methods includes a farmer using an agriculture chatbot in remote areas with weak network connectivity. The agriculture chatbot runs on the user device of the farmer and provides the farmer with timely and personalized information. By reducing downtime, delays, and costs, the agriculture chatbot makes precision agriculture accessible and beneficial to all farmers, fostering better decision-making and improved farming practices. The agriculture chatbot enables farmers to request customized insights about their farms while moving around their farm, such as "what crop would provide the most yield in the next season based on my past plantations and geographical region?" or "provide a pesticide spraying plan that considers current market prices, this year's weather conditions, and the current weed growth in my plot B field." The systems and methods aid farmers in gaining actionable intelligence, enhancing agricultural productivity and sustainability.

Referring now to FIG. 1, illustrated is an example environment 100 for using language models in locations with limited network connectivity. Limited network connectivity occurs when access to the Internet or other networks is intermit, unreliable, and/or unavailable. The environment 100 includes a hierarchical edge architecture with different tiers of edge computing with various language models across the spectrum, with small language models and medium language models at the edge and larger and more accurate LLMs on the cloud.

The hierarchical edge computing includes a frontline edge 102, a back office edge 104, and the cloud 106. The frontline edge 102 is where the user 108 is currently located. The frontline edge 102 may have intermittent network connectivity or no network connectivity available. For example, the user 108 is driving a tractor on a farm at the frontline edge 102. Another example includes the user 108 inspecting crops at the frontline edge 102. The user interacts with a user device 14 at the frontline edge 102. The user device 14 has enough compute to run a small language model 16 locally on the user device 14. Examples of the user device 14 include a mobile device, a tablet, a notebook, a laptop, or other computing devices integrated into a tractor or vehicle. In some implementations, the small language model 16 is a fine-tuned model specific to the user 108 or a context of the user 108. The fine-tuning process adjust the weights of a pre-existing model (such as Phi) so that the answers follow a format preferred by the user 108, make the model learn important aspects of the question itself, or specialize the model to consider only context important to the user 108. For example, if the user 108 is a farmer, the small language model 16 is a specialized model trained to the farmer's specific data and context important to a farmer (such as crops, geography relevant to a farmer, for example).

The user device 14 is connected to a nearby edge server, a device 18, at the back office edge 104. The back office edge 104 has some network connectivity and a device 18 with more compute available relative to the frontline edge 102. The back office edge 104 is typically in rural areas where the network connectivity may be weak or intermittent. The device 18 at the back office edge 104 supports medium language models 20. One example of the device 18 at the back office edge 104 is a personal computer. Another example of the device 18 at the back office edge 104 is a rack of servers. In some implementations, the back office edge 104 provides private network connectivity (e.g., 5G connectivity) to the location (e.g., the fields in the farm).

The device 18 at the back office edge 104 is in communication with the cloud 106. The cloud 106 hosts LLMs 22 that the user 108 may access through the device 18 at the back office edge 104 or the user device 14. The network connectivity to the cloud 106 from the back office edge 104 and/or the frontline edge 102 is typically weak or intermittent.

The environment 100 also includes online processing and offline processing. The frontline edge 102 supports the online processing. In some implementations, the online processing includes sensors 110, 112 obtaining sensory input and providing raw data 12 of the information collected in response to the sensory input. For example, the sensor 110 is a drone and the raw data 12 is images captured by the drone of a farm. An example of the sensor 112 is a thermometer and the raw data 12 is the temperature readings obtained by the thermometer. In some implementations, the sensors 110, 112 transmit the raw data 12 to the user device 14. In some implementations, the sensors 110, 112 transmit the raw data 12 to the device 18 in the back office edge 104. In some implementations, the sensors 110, 112 transmit the raw data 12 to the cloud 106.

In some implementations, the online processing includes receiving a query 10 from the user 108 and providing a response 40 to the user 108 using the small language model 16, the medium language model 20, or the LLM 22. The query 10 may be entered by the user 108 as a text prompt on a user interface of the user device 14, issued through voice command (e.g., using speech to text translation), or accompanied by a picture (e.g., an image of a particular aspect of the farm, such as a diseased crop). For example, the user 108 access a chatbot or other language model supported application on the user device 14 and provides the query 10.

The user device 14 includes a model selector 26 that receives the query 10 from the user 108 and a context 28 from a context selector 30. The context 28 includes available network connectivity of the user device 14. The model selector 26 uses the context 28 and the features of the query 10 to determine which language model (the small language model 16 at the frontline edge 102, the medium language model 20 at the back office edge 104, or the LLM 22 at the cloud 106) to use to process the query 10.

In some implementations, the context 28 includes a user context 32 and an industry context 34 obtained from a datastore 36 on the user device 14. The user context 32 includes data relevant to the user 108. For example, if the user 108 is a farmer, the user context 32 includes a crop yield for the past year, expense sheets, user manuals, and insights derived from the raw data 12 obtained by the sensors 110,

112 on the farm. The industry context 34 includes generic industry information related to the query 10. For example, if the user query 10 is related to agriculture, the industry context 34 includes current crop prices, pesticide schedules and effectiveness, and information for the geographical region, such as high-yield crops for the geographical region. In some implementations, the user context 32 and the industry context 34 is stored in vectorized databases on the user device 14. By storing data locally on the user device 14, the small language model 16 access the locally stored data and processes data locally on the user device 14 in responding to the queries 10, reducing the dependency on cloud-based resources and minimizing downtime during network connectivity interruptions or an unavailability of network connectivity.

The context selector 30 retrieves the user context 32 and the industry context 34 relevant to the query 10. In some implementations, the context selector 30 uses cosign similarity metrics to retrieve the user context 32 and the industry context 34 from the datastore 36 that is relevant to the query 10. In some implementations, the context selector 30 provides a Retrieval Augmented Generation (RAG) 24 to the context 28 (e.g., the user context 32 and the industry context 34) obtained from the datastore 36. The RAG 24 arguments the query 10 with the context 28 (e.g., any user context 32 and the industry context 34 that is relevant to the query 10) to form a prompt 38 and provides the prompt 38 to the model selector 26.

The model selector 26 uses different factors from the context 28 and the query 10 in determining which language model (the small language model 16 at the frontline edge 102, the medium language model 20 at the back office edge 104, or the LLM 22 at the cloud 106) to use to process the query 10. In some implementations, the factors include availability of the network connectivity, complexity of the query 10, compute load of the user device 14, compute load of the device 18, data availability on the user device 14, and required accuracy for the query 10. For example, the model selector 26 uses the small language model 16 at the frontline edge 102 to reduce cost and provide service even in face of network disconnections unless the desired accuracy or performance is unable to be achieved at the frontline edge 102 in responding to the query 10, in which case the model selector 26 chooses to use the medium language model 20 at the back office edge 104 or the LLM 22 at the cloud 106.

Another example includes the model selector 26 selecting the medium language model 20 in the back office edge 104 to provide the response 40 to the query 10 in response to determining that a current compute load of the user device 14 is unable to support a response to the query 10 and enough network connectivity exists between the user device 14 and the back office edge 104 for the medium language model 20 to provide the response 40 to the query 10. Another example includes the model selector 26 selecting the small language model 16 at the user device 14 to respond to the query 10 in response to determining that the small language model 16 can handle the semantics of the query 10 (e.g., the semantics of the query are not complex). Another example includes the model selector 26 selecting the LLM 22 in the cloud 106 in response to determining the small language model 16 is unable to provide an accurate response 40 to the query 10 using the data stored locally on the user device 14.

The selected language model (the small language model 16 at the frontline edge 102, the medium language model 20 at the back office edge 104, or the LLM 22 at the cloud 106) receives the query 10 and the context 28 and provides a response 40 to the query 10. The response 40 is presented to the user 108 on the user device 14. In some implementations, a response post processor on the user device 14 provides the response 40 to the user 108, for example, on a web user interface of the user device 14 in response to the user 108 providing the query 10.

The environment 100 also includes offline processing that includes automated generation of user specific context (e.g., the user context 32 and/or the industry context 34) that is sent to the user device 14 for storage in the datastore 36. In some implementations, the offline processing occurs in parallel to the online processing. In some implementations, the offline processing occurs in the back office edge 104. In some implementations, the offline processing occurs in the cloud 106. In some implementations, the offline processing occurs in both the back office edge 104 and the cloud 106. By processing the user specific context offline, the compute power is leveraged between the user device 14 at the frontline edge 102 and devices of the back office edge 104 (e.g., the device 18) and devices of the cloud 106.

The user specific contexts are extracted from various sources. Example sources include external sources (e.g., generic industry documents online), the users personalized contexts either on the back office edge 104 (e.g., expense sheets, seed information sheets or equipment manuals owned by the user) or in the cloud 106 (data, such as, field boundaries), and processed insights from machine learning pipelines (such as weed maps, heat maps, NDVI indexes). In some implementations, the user specific context is automatically derived from processing various forms of sensory input obtained by the sensors (e.g., the sensors 110, 112) at the frontline edge 102. For example, the sensors are on a farm and the sensory input is drone imagery of the farm, sensor data, and satellite imagery of the farm and the external sources include the weather conditions at the farm. Example user specific context automatically generated include maps of vegetation index (NDVI), weed maps, humidity maps, and irrigation maps.

A context generator 42 processes the user specific contexts and derives machine learning vectorized formats of the various input contexts (the user context 32 and the industry context 34) and sends the user context 32 and the industry context 34 for storage in a vectorized database (the datastore 36) on the user device 14 at the frontline edge 102 as well as the cloud 106 for a rich historical view. The data is available for use by the small language model 16 on the user device 14 to provide responses 40 to queries 10 provided by the user 108 even if the user device 14 is unable to connect to a network or has limited network connectivity.

In some implementations, the context generator 42 is triggered to automatically generate the user specific context in response to collection of raw data 12 directly from the sensors 110, 112. For example, the context generator 42 is triggered to automatically generate the user specification context after a drone flight or periodic sensor readings. The context generator 42 processes and generates the user context 32 in response to the raw data 12 provided by the sensors 110, 112. Processing the raw data 12 in the back office edge 104 avoids expensive data uploads to the cloud 106 and reduced latency.

In some implementations, the user context 32 and the industry context 34 is generated in the cloud 106. For example, external sources, such as satellite imagery or weather predictions, periodically trigger the generation of the updated user context 32 and the industry context 34 processing in the cloud using the additional resources available to update the user context 32 and the industry context 34 stored on the user device 14.

The workflow scheduler 44 in the back office edge 104 determines where to generate the user specific context (the back office edge 104 or the cloud 106). The generated user specific context (the user context 32 and the industry context 34) is sent to the user device 14 on the frontline edge 102 ensuring the availability for use by the small language model 16 on the user device 14 in responding to future queries 10 from the user 108. In some implementations, the workflow scheduler 44 schedules generation of the user specific context (the user context 32 and the industry context 34) in response to past queries received by the user 108. For example, if the user 108 is asking numerous questions about wheat, the workflow scheduler 44 schedules generation of the industry context 34 and the user context 32 relating to wheat so that the industry context 34 and the user context 32 relating to wheat is sent to the user device 14 and available for use with the small language model 16 in responding to future queries 10 received from the user 108.

The combination of hierarchical edge computing, specialized language models, and automated context generation provides the user 108 with efficient and personalized insights, overcoming challenges posed by weak network connections and facilitating informed decision-making in locations with limited network connectivity.

In some implementations, one or more computing devices (e.g., servers and/or devices) are used to perform the processing of the environments 100. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. Moreover, in some implementations, one or more subcomponent of the feature and functionalities discussed herein may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
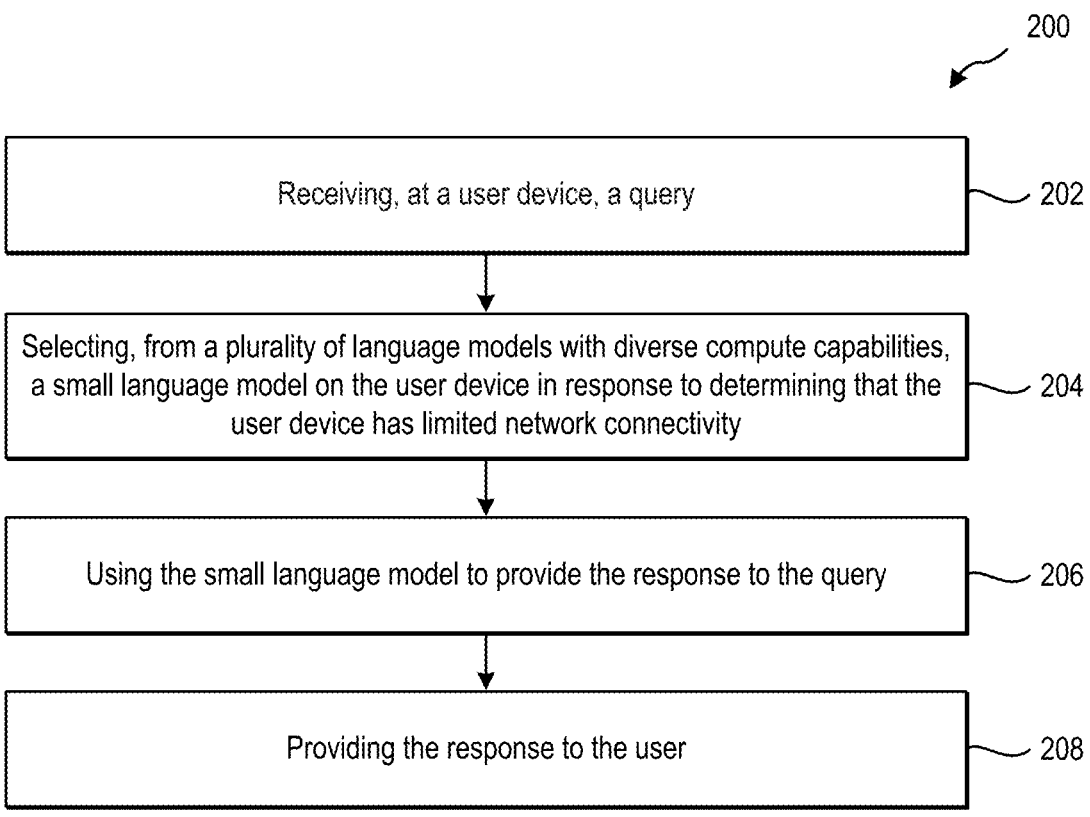
FIG. 2 illustrates an example method for selecting a language model for use in locations with limited network connectivity in accordance with implementations of the present disclosure.

FIG. 2 illustrates a method 200 for selecting a language model for use in locations with limited network connectivity. The actions of the method 200 are discussed below in reference to FIG. 1.

At 202, the method 200 includes receiving, at a user device, a query. The user device 14 receives a query 10 from a user 108. For example, the user 108 accesses a chatbot or other language model supported application on the user device 14 and provides a query 10. In some implementations, the query 10 is specific to the user 108. For example, the user 108 is a farmer and the query 10 is "which crop should I plant next season?"

At 204, the method 200 includes selecting, from a plurality of language models with diverse compute capabilities, a small language model (SLM) on the user device in response to determining that the user device has limited network connectivity. In some implementations, a model selector 26 on the user device 14 selects, from the plurality of language models with diverse compute capabilities, the small language model 16 on the user device 14 in response to determining that the user device 14 has limited network connectivity. In some implementations, the model selector 26 determines that the user device 14 has limited network connectivity in response to querying an operating system on the user device 14. In some implementations, the model selector 26 determines that the user device 14 has limited network connectivity in response to trying to establish communication with an online system. For example, the model selector 26 determines that the network connectivity of the user device 14 is periodically unavailable and selects the small language model 16 on the user device 14 in response to detecting the unavailability of the network connection. Another example includes the model selector 26 determining that the network connectivity of the user device 14 is weak and selects the small language model 16 on the user device 14 in response to detecting the weak network connectivity.

In some implementations, the plurality of language models include the small language model 16 at the user device 14, a medium language model 20 at a device 18 of a back office edge 104 in communication with the user device 14, and an LLM 22 at a device of a cloud network 106 in communication with the user device 14. The small language model 20 has less compute and memory footprint as compared to the medium language model 20 and the LLM 22, and the medium language model 20 has more compute and memory footprint as compared to the small language model 16 and less compute and memory footprint as compared to the LLM 22. LLMs have memory footprints that prevent the LLMs from running in a single device. A small language model fits in a device (such as a notebook), a medium language model typically fits in a single server, and LLMs use multiple servers.

In some implementations, the model selector 26 selects, from the plurality of language models, a medium language model 20 on a device 18 at a back office edge 104 in communication with the user device 14 to provide the response 40 to the query 10 in response to determining that the small language model 16 is unable to provide the response 40 to the query 10 within a latency threshold. The latency threshold is a time limit in which the query 10 should be provided to the user 108. For example, the small language model 16 is unable to provide the response 40 to the query 10 within the latency threshold due to a complexity of the query 10. For example, the small language model 16 is unable to provide the response 40 to the query 10 within the latency threshold due to a current processing load of the user device 14.

In some implementations, the model selector 26 selects, from the plurality of language models, the LLM 22 at a cloud 106 network in communication with the user device 14 to provide the response 40 to the query 10 in response to determining that the small language model 16 is unable to provide an accurate response to the query 10 using the context (the user context 32 and the industry context 34) stored on the user device 14. For example, the small language model 16 is unable to provide an accurate response 40 to the query 10 due to a complexity of the query 10. Another example includes the small language model 16 is unable to provide an accurate response 40 to the query 10 because access to different datasets is needed to respond to the query 10.

In some implementations, the model selector 26 uses a plurality of factors in determining which language model (the small language model 16, the medium language model 20, or the LLM 22) to select from the plurality of language models. For example, the factors include availability of the network connectivity, complexity of the query 10, semantic content of the query 10, a compute load of the user device 14, a compute load of the device 18, data availability on the user device 14, and required accuracy for the query 10. For example, depending on the content of the query 10, a local fine-tuned small language model 16 may be used as opposed to a large cloud LLM 22.

At 206, the method 200 includes using the small language model on the user device to provide the response to the query. In some implementations, the small language model 16 uses the context 28 stored on the user device 14 (e.g., the user context 32 and the industry context 34) in the datastore 36 to provide the response 40 to the query 10. The context selector 30 retrieves the context 28 relevant to the query 10. In some implementations, the context selector 30 uses cosign similarity metrics to retrieve the context 28 from the datastore 36 that is relevant to the query 10.

In some implementations, the context includes user context 32 with data specific to the user 108 and the response 40 is tailored to the user 108 using the data specific to the user 108. In some implementations, the context includes industry context 34 with data specific to an industry related to the user 108. For example, the user context 32 is farm data specific to the user 108 and the industry context 34 is agriculture data specific to the user 108.

In some implementations, the user device 14 periodically receives the context (e.g., the user context 32 and the industry context 34) from a device 18 at a back office edge 104 in communication with the user device 14. In some implementations, the user device 14 periodically receives the context (e.g., the user context 32 and the industry context 34) from devices on a cloud 106 network in communication with the user device 14. For example, the context is obtained from external sources and information specific to the user.

In some implementations, the context (e.g., the user context 32 and the industry context 34) is automatically generated by a device 18 at a back office edge 104 in communication with the user device or devices on a cloud 106 network in communication with the user device 14 in response to sensory data (e.g., the raw data 12) obtained by sensors (e.g., the sensors 110, 112) at a location; and the context is provided to the user device 14 for storage in vectorized databases.

At 208, the method 200 includes providing the response to the user. The user device 14 provides the response 40 to the user 108. For example, the response 40 is provided on a user interface of a chatbot or other language model supported application on the user device 14.

The method 200 facilitates informed decision-making in locations with limited network connectivity by dynamically selecting a language model to use in a tier of the hierarchical edge architecture in response to a query received by a user device based on a current network connectivity of a user device.

Figure 3:
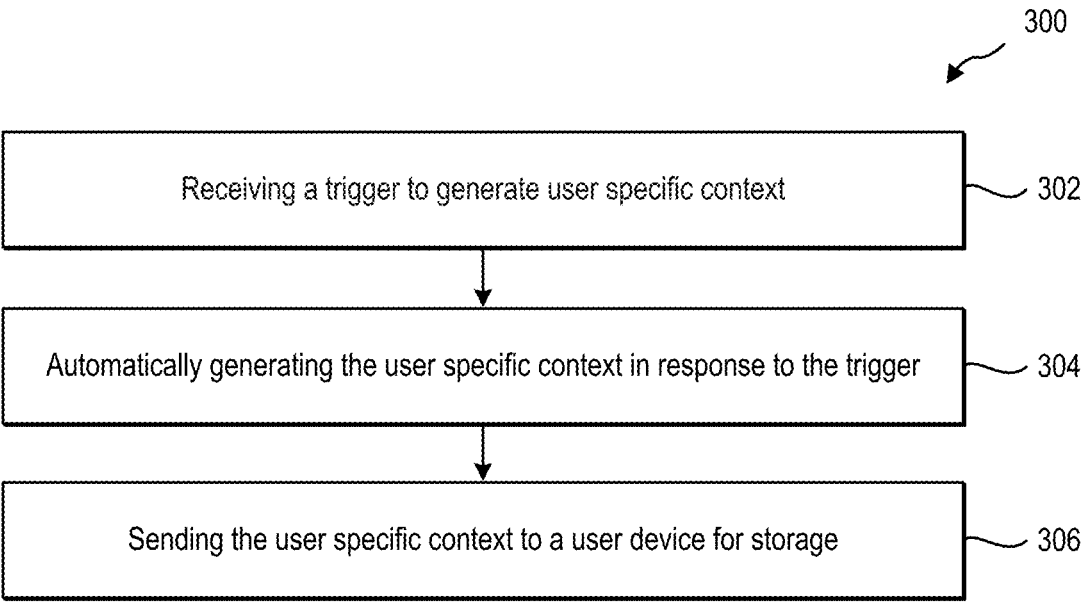
FIG. 3 illustrates an example method for generating user specific context in accordance with implementations of the present disclosure.

FIG. 3 illustrates an example method 300 for generating user specific context. The actions of the method 300 are discussed below in reference to FIG. 1.

At 302, the method 300 includes receiving a trigger to generate user specific context. In some implementations, a workflow scheduler 44 on a device 18 in the back office edge 104 receives a trigger to generate user specific context. For example, a trigger is raw data 12 received from sensors 110, 112 at a location (e.g., sensors on a farm provided new data or sensors on an oil well provided new data). Another example of a trigger is a time period. For example, every two days a trigger is sent to the workflow scheduler 44 to generate user specific context. Another example of trigger is frequent queries 10 from the user 108. For example, the user 108 starts asking several questions about irrigation.

At 304, the method 300 includes automatically generating the user specific context in response to the trigger. In some implementations, the user specific context is automatically generated in parallel to the online processing of providing responses 40 to queries 10 provided by the user 108.

In some implementations, the user specific contexts are automatically extracted from various sources in response to the trigger. Example sources include external sources (e.g., generic industry documents online), the private sources of the user 108 either on the back office edge 104 (e.g., expense sheets, seed information sheets or equipment manuals owned by the user) or in the cloud 106 (user data, such as, field boundaries), and processed insights of the user data from machine learning pipelines (such as weed maps, heat maps, NDVI indexes). The user specific context automatically extracted from the industry documents may be tailored based on the user's geographic region.

In some implementations, the user specific context is automatically derived from processing various forms of sensory input obtained by the sensors (e.g., the sensors 110, 112) at the frontline edge 102. For example, the sensors are on a farm and the sensory input is drone imagery of the farm. Another example is satellite imagery of the farm from sensors outside of the frontline edge 102 with the imagery stored in the cloud 106. After processing, derived data from the satellite data (such as indices) is moved from the cloud 106 to the frontline edge 102. Examples of user specific context automatically generated include maps of vegetation index (NDVI), weed maps, humidity maps, and irrigation maps.

The workflow scheduler 44 in the back office edge 104 determines where to generate the user specific context (the back office edge 104 or the cloud 106). In some implementations, the workflow scheduler 44 uses a mixture of a size of the data, a location of the data, and a complexity to compute the data in determining where to generate the user specific context. For example, large datasets that are collected in the farm (such as drone imagery) are processed in the back office edge 104 (so that the large dataset is not moved to a cloud system). Another example includes large datasets (e.g., several GBs of data) that are stored in the cloud 106 (such as satellite data) are processed in the cloud 106. In some implementations, the user specific context is automatically generated in the back office edge 104. The context generator 42 processes and generates the user context 32 in response to the raw data 12 provided by the sensors 110, 112. Processing the raw data 12 in the back office edge 104 avoids expensive data uploads to the cloud 106 and reduced latency.

In some implementations, the user specific context is automatically generated in the cloud 106. For example, external sources, such as satellite imagery or weather predictions, periodically trigger the generation of the updated user context 32 and the industry context 34 processing in the cloud using the additional resources available to update the user context 32 and the industry context 34. In some implementations, the user specific context is automatically generated in both the back office edge 104 and the cloud 106. The context generator 42 processes the user specific contexts and derives machine learning vectorized formats of the various input contexts (the user context 32 and the industry context 34).

At 306, the method 300 includes sending the user specific context to a user device for storage. The context generator 42 sends the user context 32 and the industry context 34 for storage in a vectorized database (the datastore 36) on the user device 14 at the frontline edge 102 as well as the cloud 106 for a rich historical view. The data is available for use by the small language model 16 on the user device 14 to provide responses 40 to future queries 10 provided by the user 108 even if the user device 14 is unable to connect to a network or has limited network connectivity.

The method 300 is used to automatically generate the user specific context and provide the context to the devices at the frontline edge so that the context is available for use with the small language model 16 to respond to queries 10 provided by the user 108.

Figure 4:
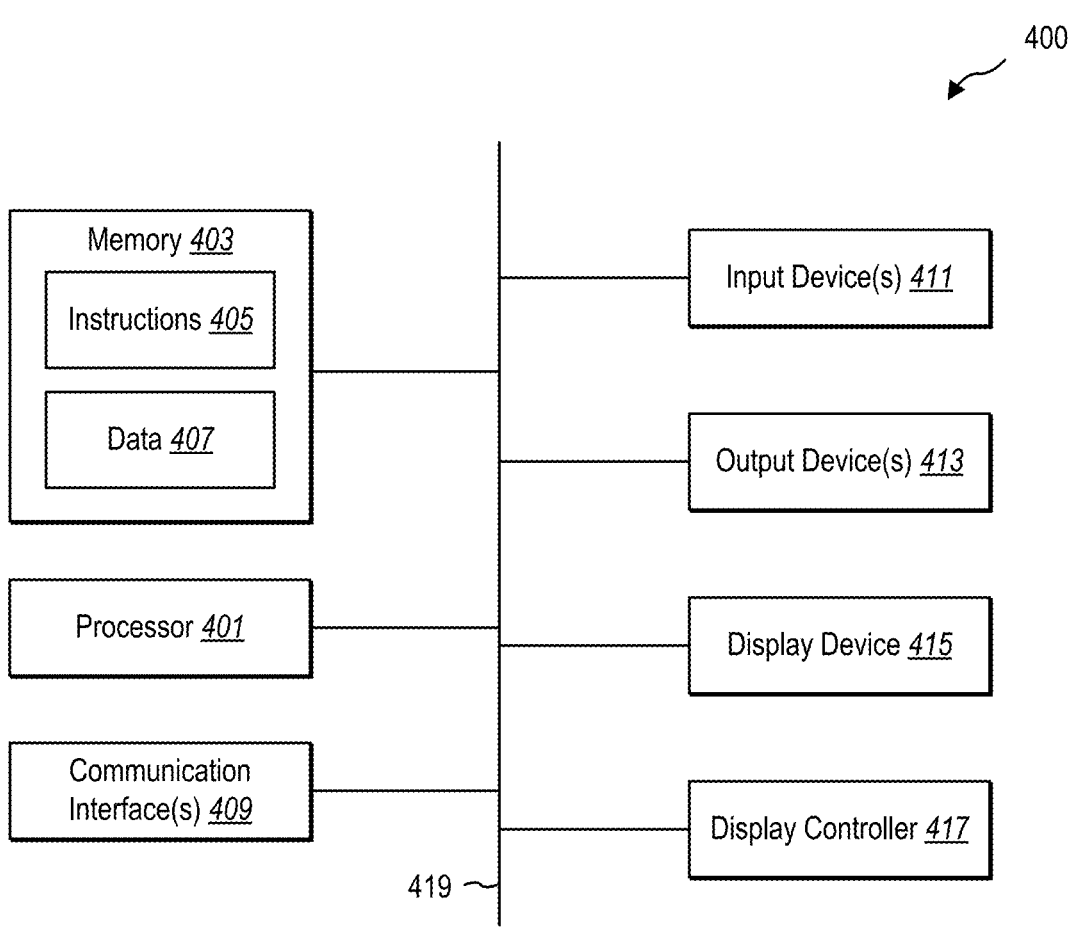
FIG. 4 illustrates components that may be included within a computer system.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

In some implementations, the various components of the computer system 400 are implemented as one device. For example, the various components of the computer system 400 are implemented in a mobile phone or tablet. Another example includes the various components of the computer system 400 implemented in a personal computer. Another example includes the various components of the computer system 400 implemented in the cloud. Another example includes the various components of the computer system 400 implemented on an edge device.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method comprising:
receiving, at a user device, a query;
selecting, from a plurality of language models with diverse compute capabilities, a small language model (SLM) on the user device based on data available on the user device, query parameters of the query, a required accuracy for the query, and available network connectivity;
retrieving user context and industry context relevant to the query from the data on the user device, wherein the user context and the industry context is automatically generated from collected data and provided in vectorized databases for storage on the user device;
using the SLM to provide a response to the query tailored to the user context and the industry context; and
providing the response to a user.

2. The method of claim 1, wherein the plurality of language models include the SLM at the user device, a medium language model at a device of a back office edge in communication with the user device, and a large language model (LLM) at a device of a cloud network in communication with the user device.

3. The method of claim 2, wherein the SLM has less compute and memory footprint as compared to the medium language model and the LLM, and the medium language model has less compute and memory footprint as compared to the LLM.

4. The method of claim 1, further comprising:
selecting, from the plurality of language models, a medium language model on a device at a back office edge in communication with the user device to provide the response to the query in response to determining that the SLM is unable to provide the response to the query within a latency threshold, wherein the medium language model includes more compute and memory footprint as compared to the SLM.

5. The method of claim 1, further comprising:
selecting, from the plurality of language models, a large language model (LLM) at a cloud network in communication with the user device to provide the response to the query in response to determining that the SLM is unable to provide an accurate response to the query, wherein the LLM includes more compute and memory footprint as compared to the SLM.

6. The method of claim 1, further comprising:
using, by the SLM, the user context and the industry context stored on the user device to provide the response to the query.

7. The method of claim 6, wherein the user context includes information obtained from private documents of the user with data specific to the user and the response is tailored to the user using the data specific to the user.

8. The method of claim 6, wherein the industry context includes data specific to an industry that is related to the user.

9. The method of claim 6, further comprising:
periodically receiving the context from a device at a back office edge in communication with the user device or devices on a cloud network in communication with the user device, wherein the context is obtained from external sources and information specific to the user.

10. The method of claim 6, wherein the user context and the industry context is automatically generated by a device at a back office edge in communication with the user device or devices on a cloud network in communication with the user device in response to sensory data obtained by sensors at a location.

11. A user device comprising:
a memory to store data and instructions; and
a processor operable to communicate with the memory, wherein the processor is operable to:
receive a query;
select, from a plurality of language models with diverse compute capabilities, a small language model (SLM) on the user device based on data available on the user device, query parameters of the query, a required accuracy for the query, and available network connectivity;
retrieving user context and industry context relevant to the query from the data on the user device, wherein the user context and the industry context is automatically generated from collected data and provided in vectorized databases for storage on the user device;
use the SLM on the user device to provide a response to the query tailored to the user context and the industry context; and
provide the response to a user.

12. The user device of claim 11, wherein the plurality of language models include the SLM at the user device, a medium language model at a device of a back office edge in communication with the user device, and a large language model (LLM) at a device of a cloud network in communication with the user device.

13. The user device of claim 12, wherein the SLM has less compute as compared to the medium language model and the LLM, and the medium language model has more compute as compared to the SLM and less compute as compared to the LLM.

14. The user device of claim 11, wherein the processor is further operable to select, from the plurality of language models, a medium language model on a device at a back office edge in communication with the user device to provide the response to the query in response to determining that the SLM is unable to provide the response to the query within a latency threshold, wherein the medium language model includes more compute as compared to the SLM.

15. The user device of claim 11, wherein the processor is further operable to select, from the plurality of language models, a large language model (LLM) at a cloud network in communication with the user device to provide the response to the query in response to determining that the SLM is unable to provide an accurate response to the query, wherein the LLM includes more compute as compared to the SLM.

16. The user device of claim 11, wherein the processor is further operable to use, by the SLM, the user context and the industry context stored on the user device to provide the response to the query.

17. The user device of claim 16, wherein the context includes user context with data specific to the user obtained from images of a location of the user and the response is tailored to the user using the data specific to the user.

18. The user device of claim 16, wherein the industry context includes data specific to an industry that is related to the user.

19. The user device of claim 16, wherein the processor is further operable to periodically receive the context from a device at a back office edge in communication with the user device or devices on a cloud network in communication with the user device, wherein the context is obtained from external sources and information specific to the user.

20. The user device of claim 16, wherein the context is automatically generated by a device at a back office edge in communication with the user device or devices on a cloud network in communication with the user device in response to sensory data obtained by sensors at a location; and the context is provided to the user device for storage in vectorized databases.

* * * * *